(12) United States Patent
Frenken et al.

(10) Patent No.: US 7,814,827 B2
(45) Date of Patent: Oct. 19, 2010

(54) LOCKING BOLT FOR MOUNTING A TOOL ON A HYDRAULIC PRESS

(75) Inventors: Egbert Frenken, Heinsberg (DE); Frank Wilsdorf, Wermelskirchen (DE)

(73) Assignee: Gustav Klauke GmbH (DE)

( * ) Notice: Subject to any disclaimer, the term of this patent is extended or adjusted under 35 U.S.C. 154(b) by 478 days.

(21) Appl. No.: 11/943,797

(22) Filed: Nov. 21, 2007

(65) Prior Publication Data
US 2008/0069663 A1    Mar. 20, 2008

Related U.S. Application Data

(60) Division of application No. 11/461,573, filed on Aug. 1, 2006, now abandoned, which is a continuation-in-part of application No. 10/876,830, filed on Jun. 25, 2004, now abandoned.

(30) Foreign Application Priority Data

Jun. 27, 2003 (DE) ................ 103 29 007

(51) Int. Cl.
*B30B 1/00* (2006.01)
*B21D 37/14* (2006.01)
(52) U.S. Cl. ............. 100/269.01; 100/269.15; 100/102; 100/103; 83/635; 72/409.16; 72/453.16
(58) Field of Classification Search ............ 100/219, 100/269.01, 269.15, 102, 103; 280/511; 408/241 R; 411/328, 348, 349, 351, 353, 411/356, 358; 70/184; 72/453.15, 453.16, 72/453.03, 409.16; 83/635; 173/170; 30/122
See application file for complete search history.

(56) References Cited

U.S. PATENT DOCUMENTS

| 1,260,264 | A | 3/1918 | Huszar |
| 2,923,180 | A | 2/1960 | Dunn et al. |
| 3,011,185 | A | 12/1961 | Khachigian |
| 3,659,483 | A | 5/1972 | Matthews |
| 4,430,106 | A | 2/1984 | Goodridge |
| 4,758,023 | A * | 7/1988 | Vermillion ............ 285/7 |
| 4,770,587 | A | 9/1988 | Liljedahl |
| 4,810,126 | A | 3/1989 | Lengel |
| 4,854,795 | A | 8/1989 | Duran |
| 4,881,398 | A | 11/1989 | Daubner et al. |

(Continued)

FOREIGN PATENT DOCUMENTS

DE    10110882    9/2002

(Continued)

*Primary Examiner*—Jimmy T Nguyen
(74) *Attorney, Agent, or Firm*—Clark Hill PLC

(57) ABSTRACT

A locking bolt for mounting a tool in a hydraulic press, it being possible for the locking bolt to move in a bolt receptacle between a locking position and a release position, with a securing element, which is located in the bolt receptacle and secures the locking position by positive engagement in the locking bolt, the locking bolt also having a securing portion, and the locking bolt being secured against movement into the release position when the securing element is located in the securing portion. The locking bolt has a longitudinal groove, in that the securing portion is formed with a securing depth in any event corresponding to a groove depth of the longitudinal groove and in that the securing portion is formed such that it is adjacent to the longitudinal groove in the circumferential direction, with a direct transition from a groove base into the securing position.

16 Claims, 19 Drawing Sheets

U.S. PATENT DOCUMENTS

| | | |
|---|---|---|
| 4,911,726 A | 3/1990 | Warkentin |
| 4,917,525 A | 4/1990 | Duncan |
| 4,927,286 A | 5/1990 | Hobluigie et al. |
| 4,988,243 A | 1/1991 | Proffitt |
| 5,083,883 A | 1/1992 | Ueda et al. |
| 5,169,168 A | 12/1992 | Harry et al. |
| 5,255,993 A | 10/1993 | Kovacs |
| 5,522,606 A | 6/1996 | Pressley et al. |
| 5,741,084 A | 4/1998 | Del Rio et al. |
| 5,871,222 A | 2/1999 | Webb |
| 5,980,150 A | 11/1999 | Newman et al. |
| 5,992,208 A * | 11/1999 | Hofele et al. ............ 72/405.08 |
| 6,029,535 A | 2/2000 | Kenny et al. |
| 6,065,326 A * | 5/2000 | Frenken .................... 72/453.15 |
| 6,106,026 A | 8/2000 | Smith, III |
| 6,182,491 B1 * | 2/2001 | Perlman et al. ........... 72/405.09 |
| 6,206,663 B1 * | 3/2001 | Frenken ...................... 417/549 |
| 6,230,542 B1 * | 5/2001 | Frenken ...................... 72/456 |
| 6,276,186 B1 * | 8/2001 | Frenken ................... 72/453.15 |
| 2002/0140207 A1 | 10/2002 | McCoy et al. |
| 2003/0185647 A1 | 10/2003 | Cosenza |
| 2003/0231927 A1 | 12/2003 | Hale |
| 2005/0011236 A1 | 1/2005 | Frenken et al. |

* cited by examiner

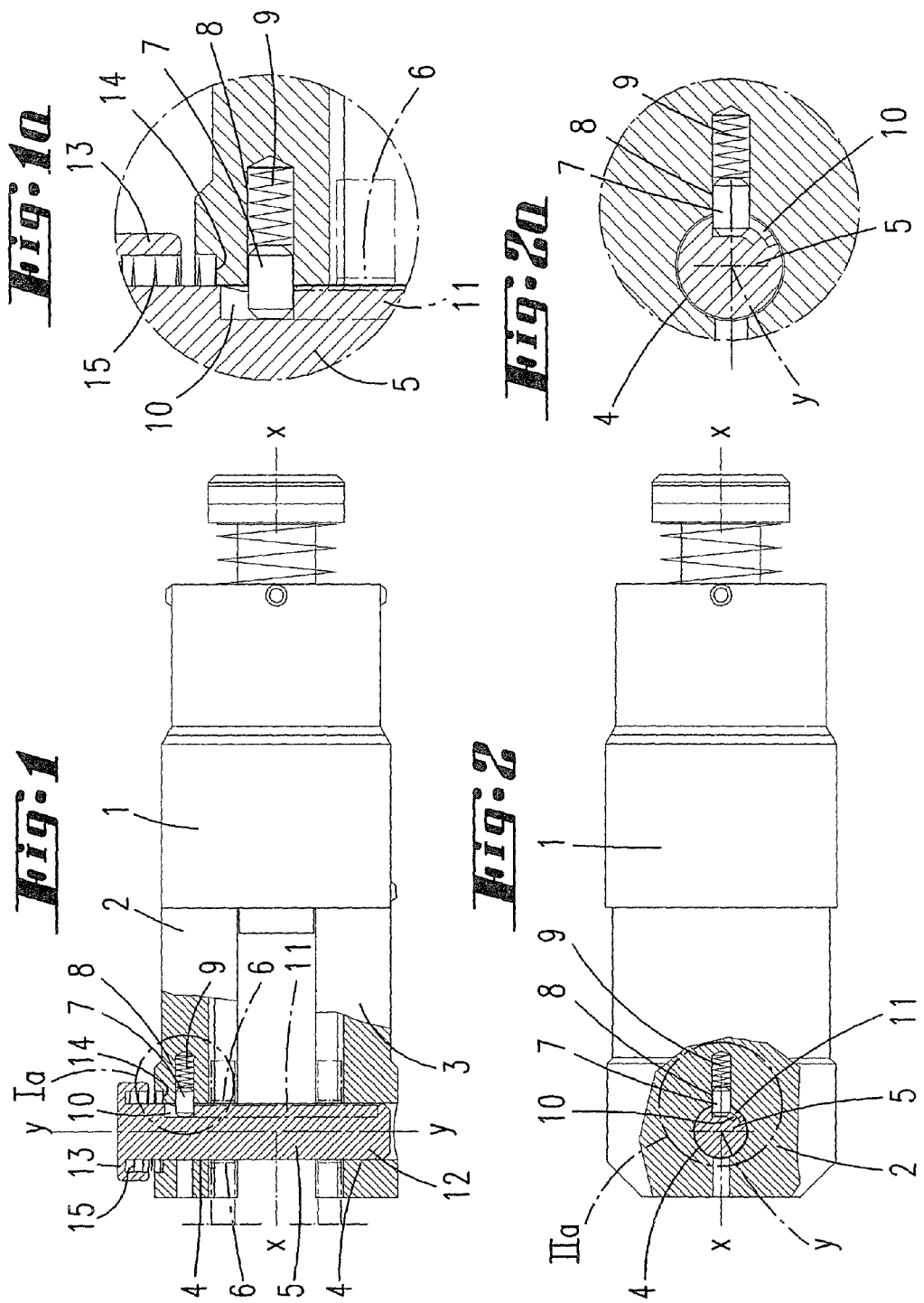

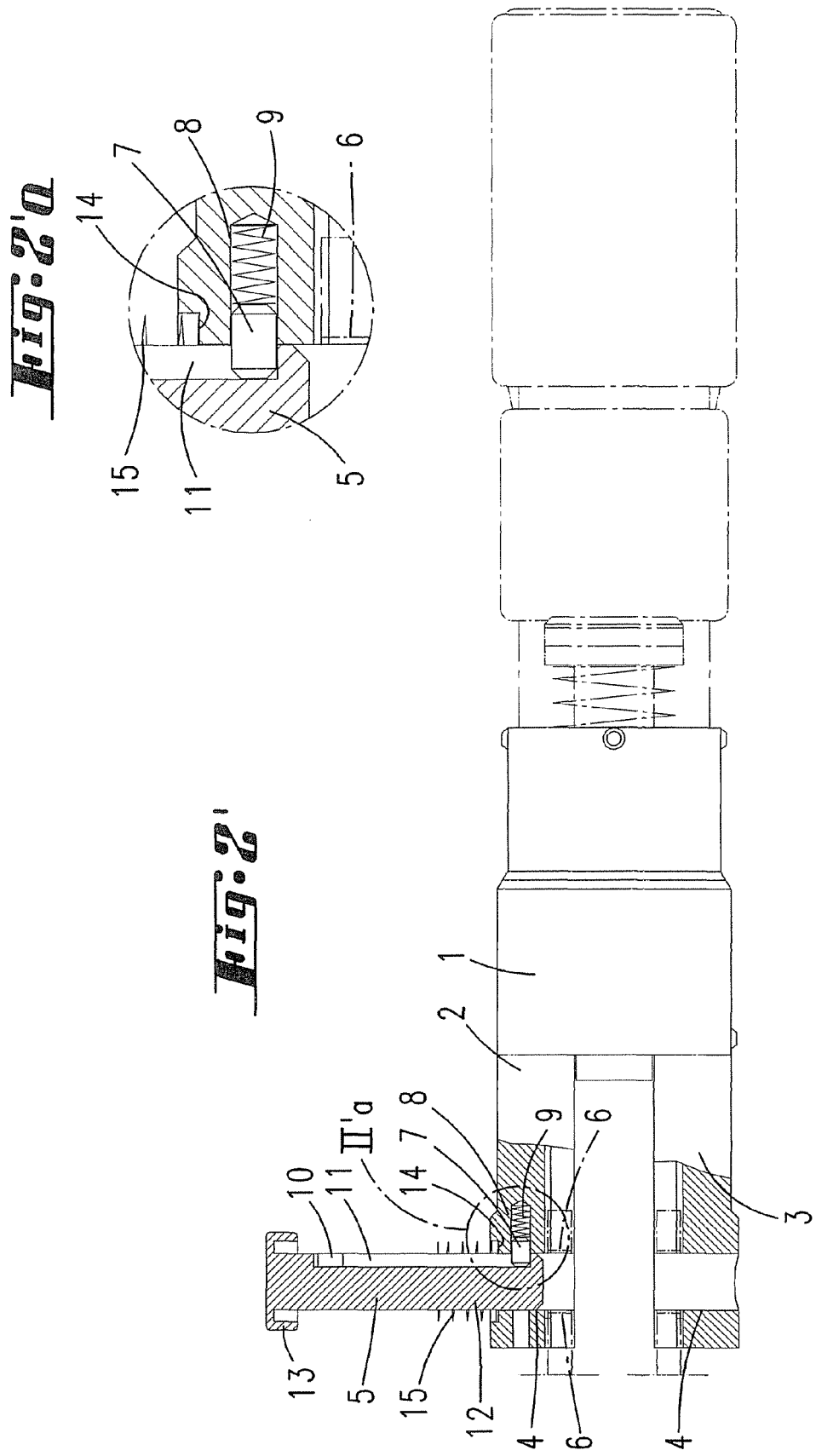

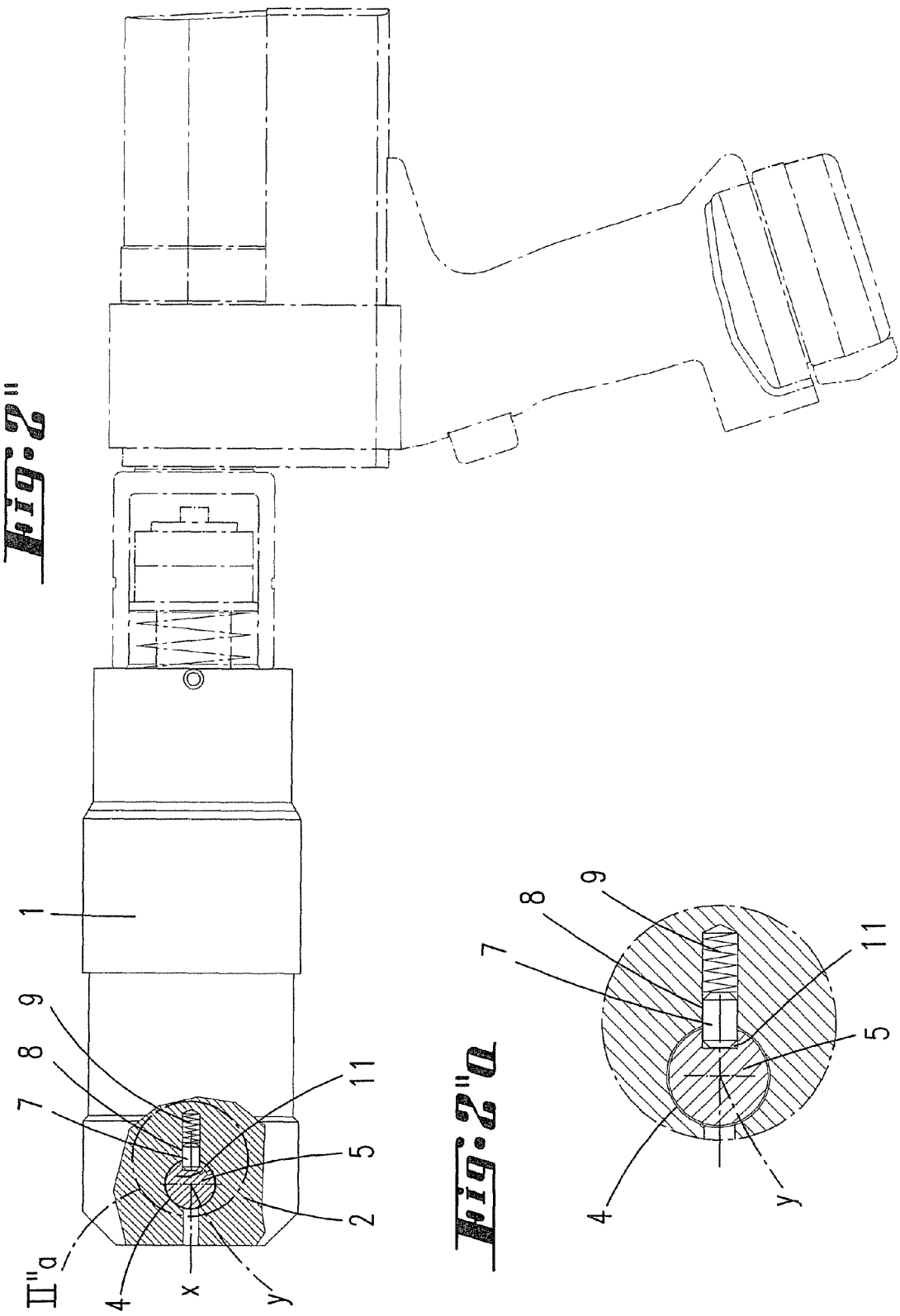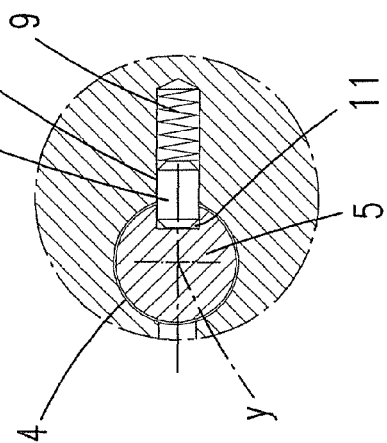

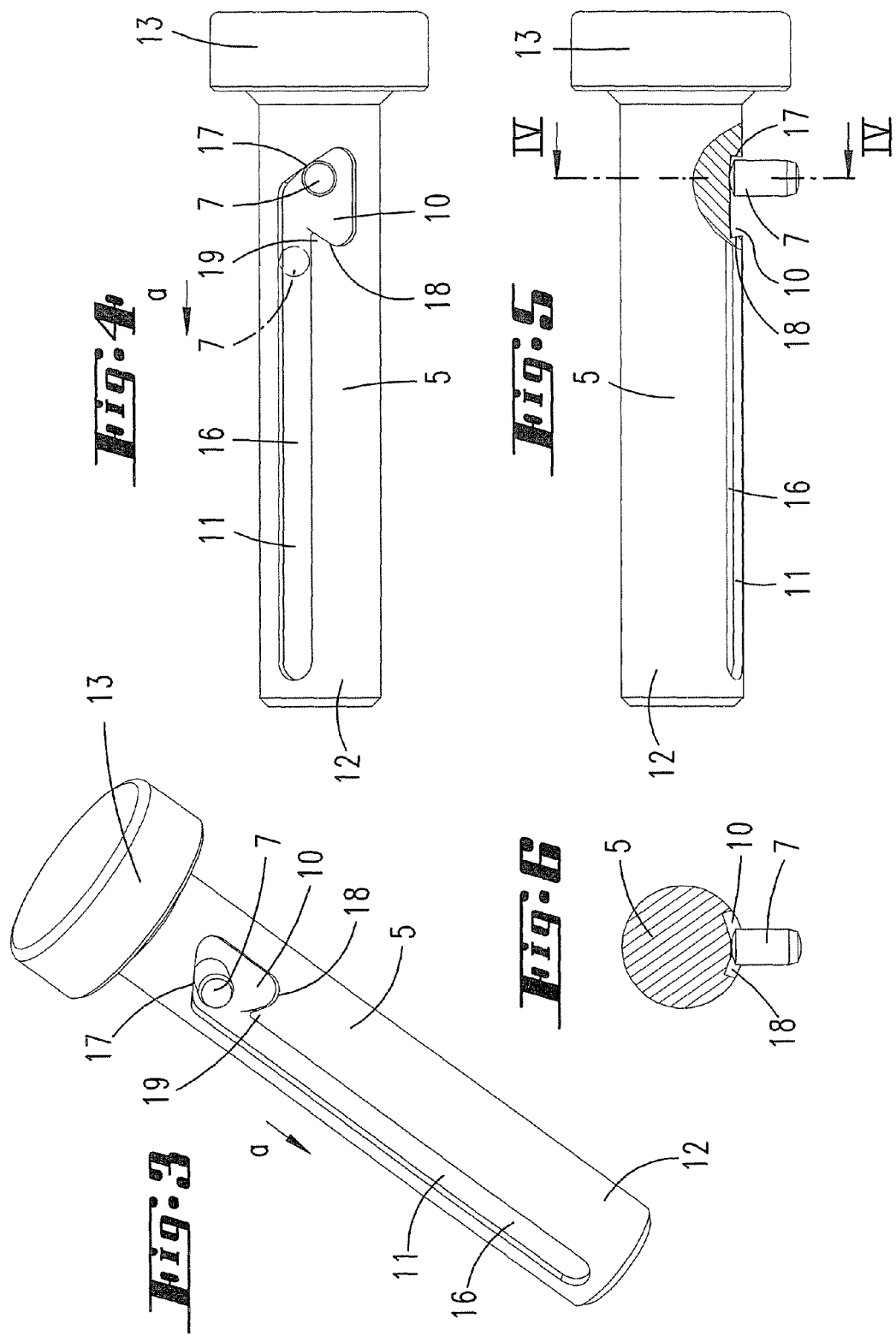

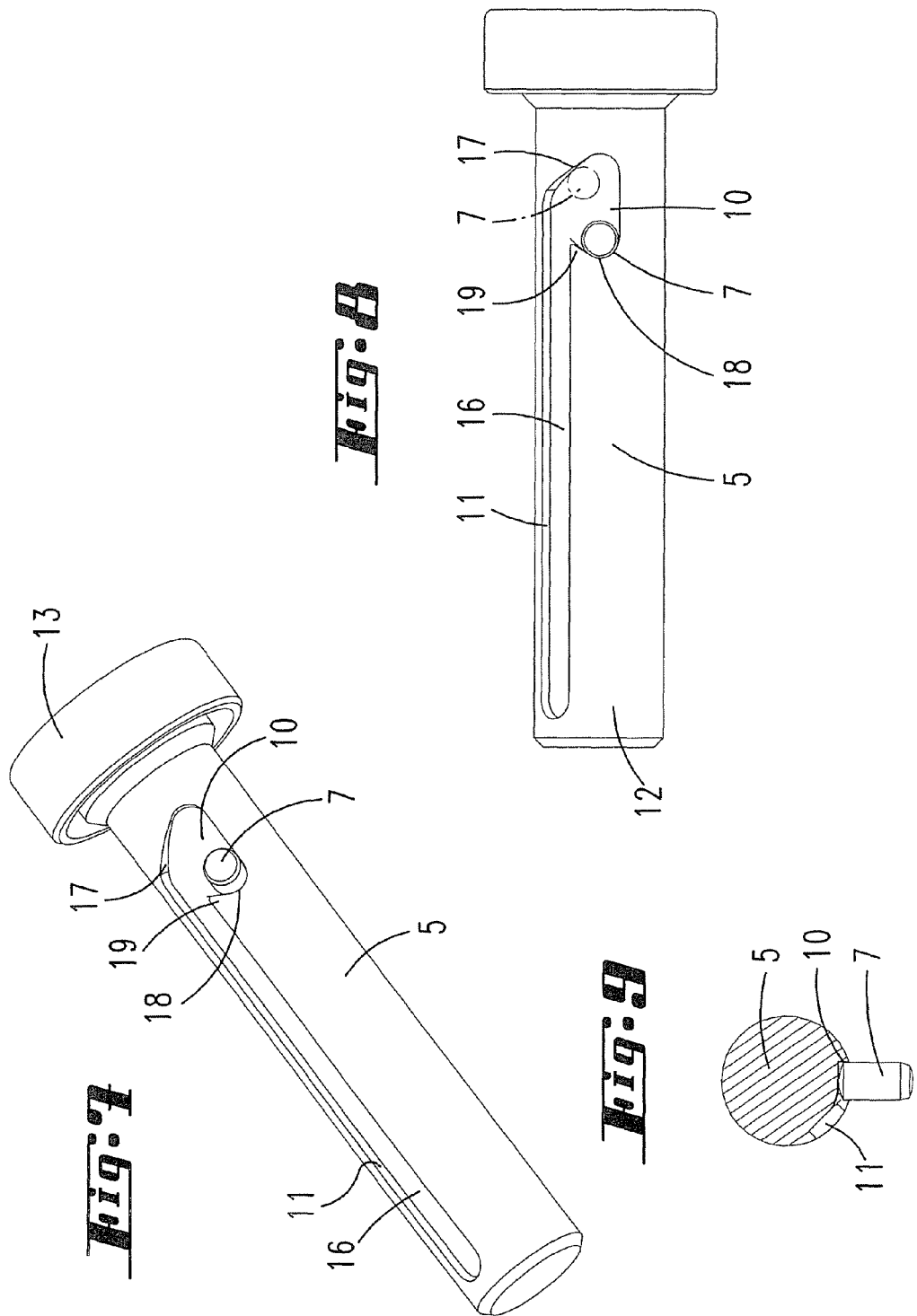

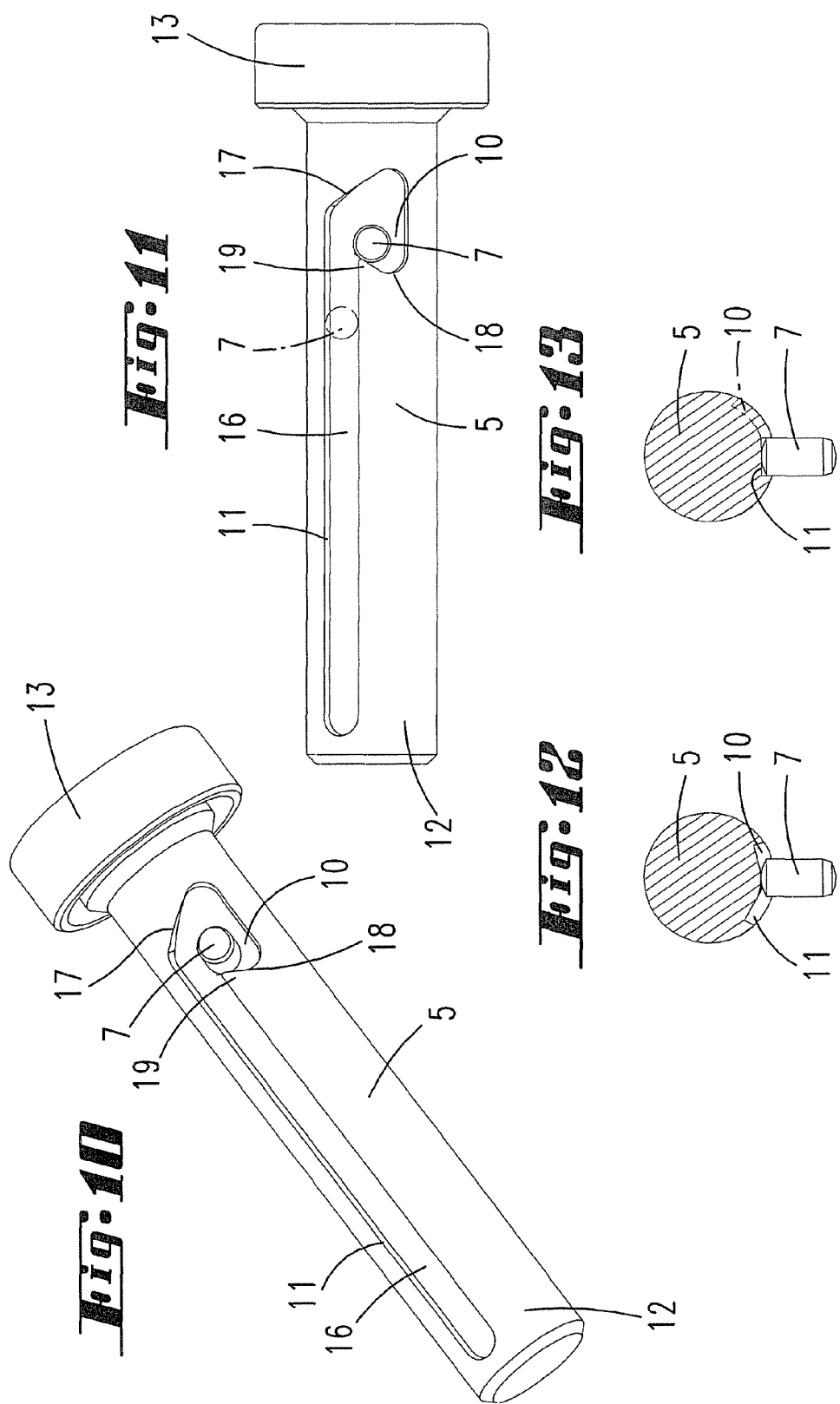

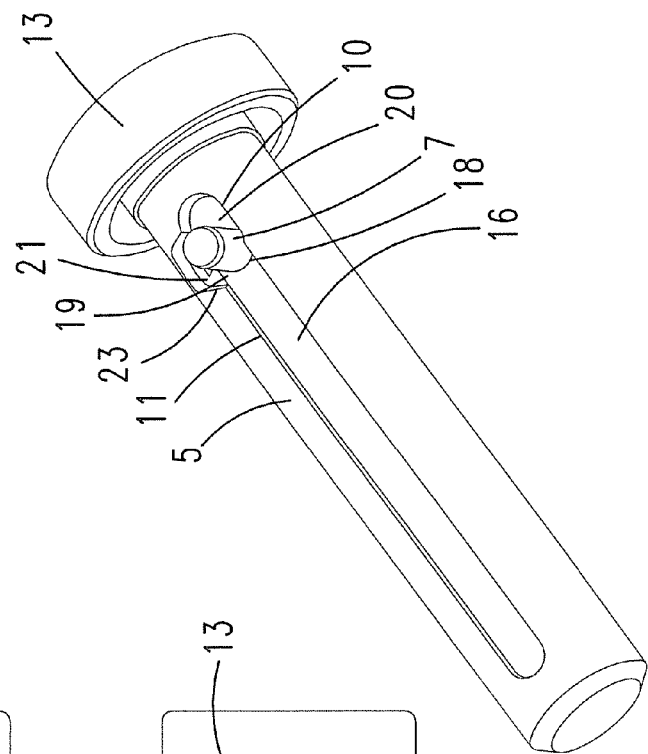
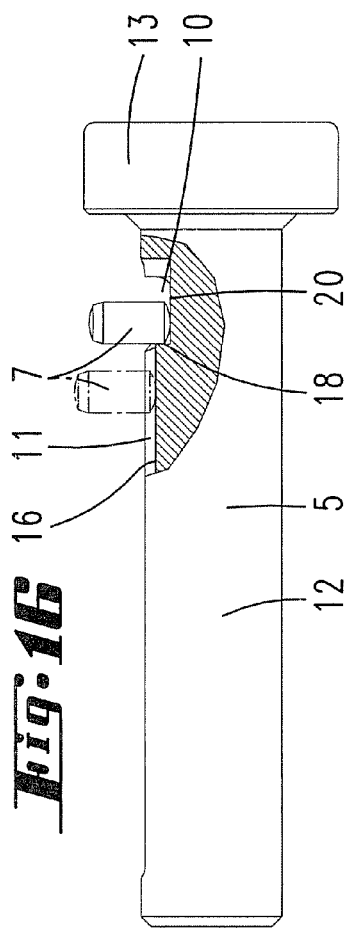

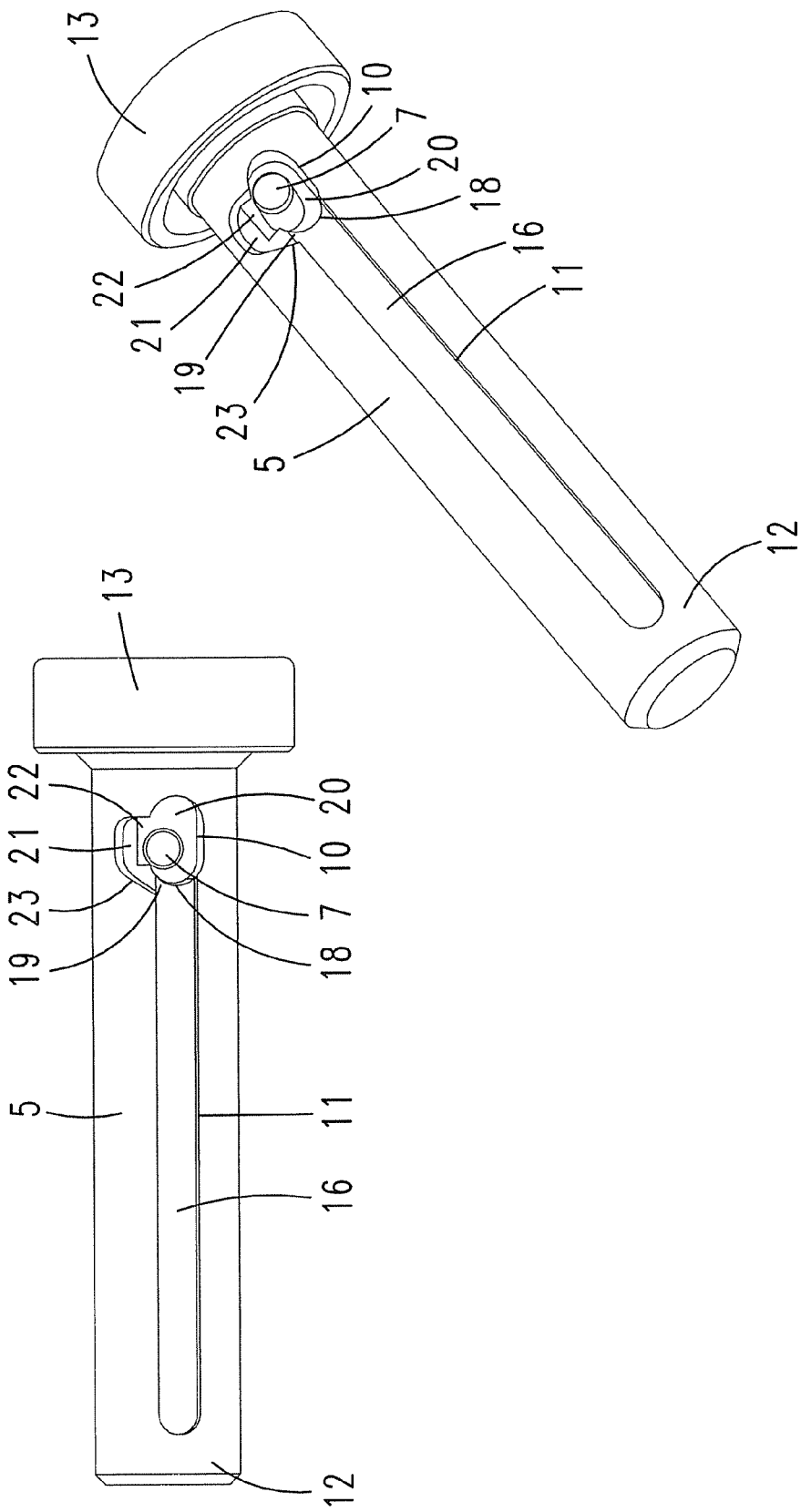

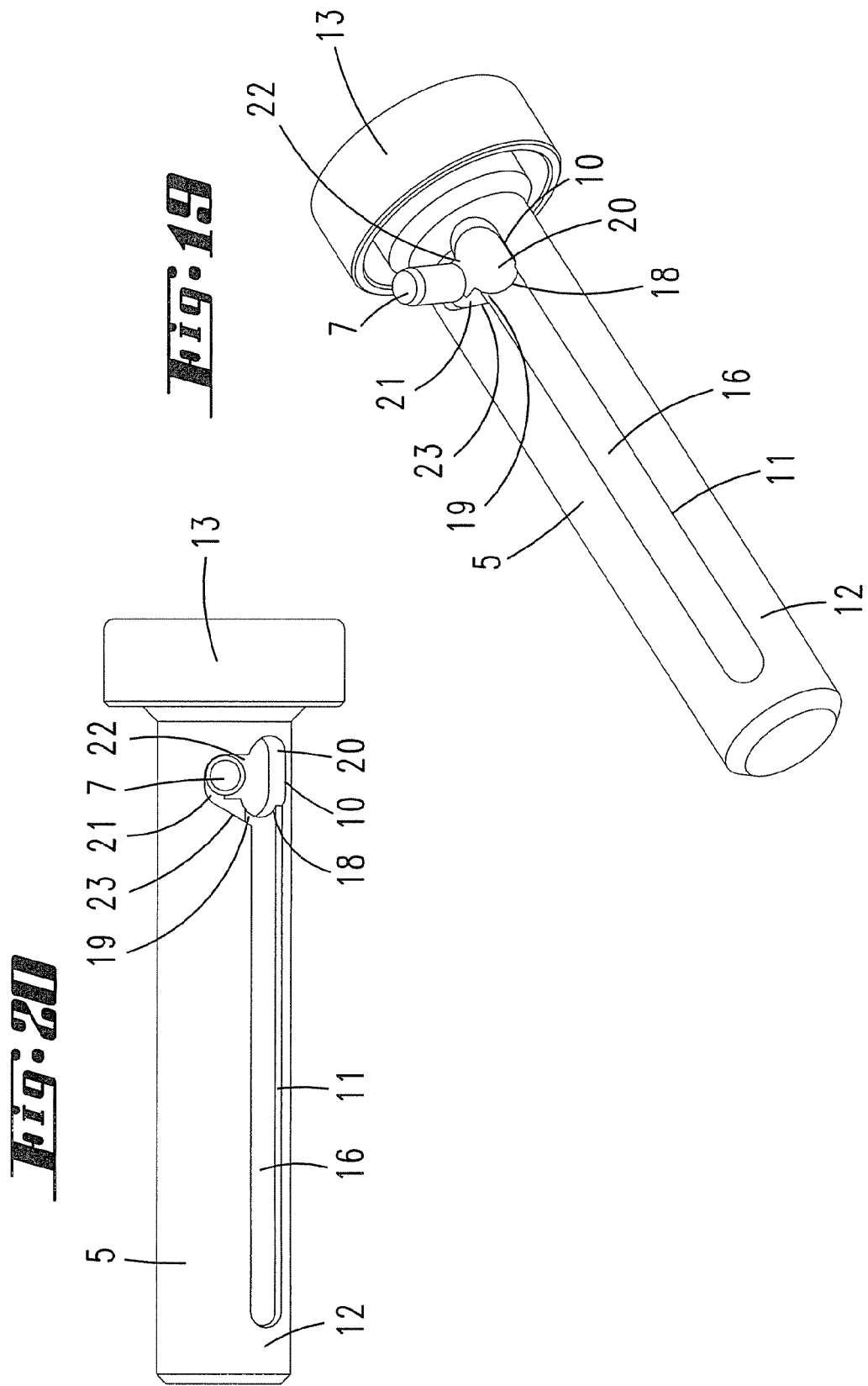

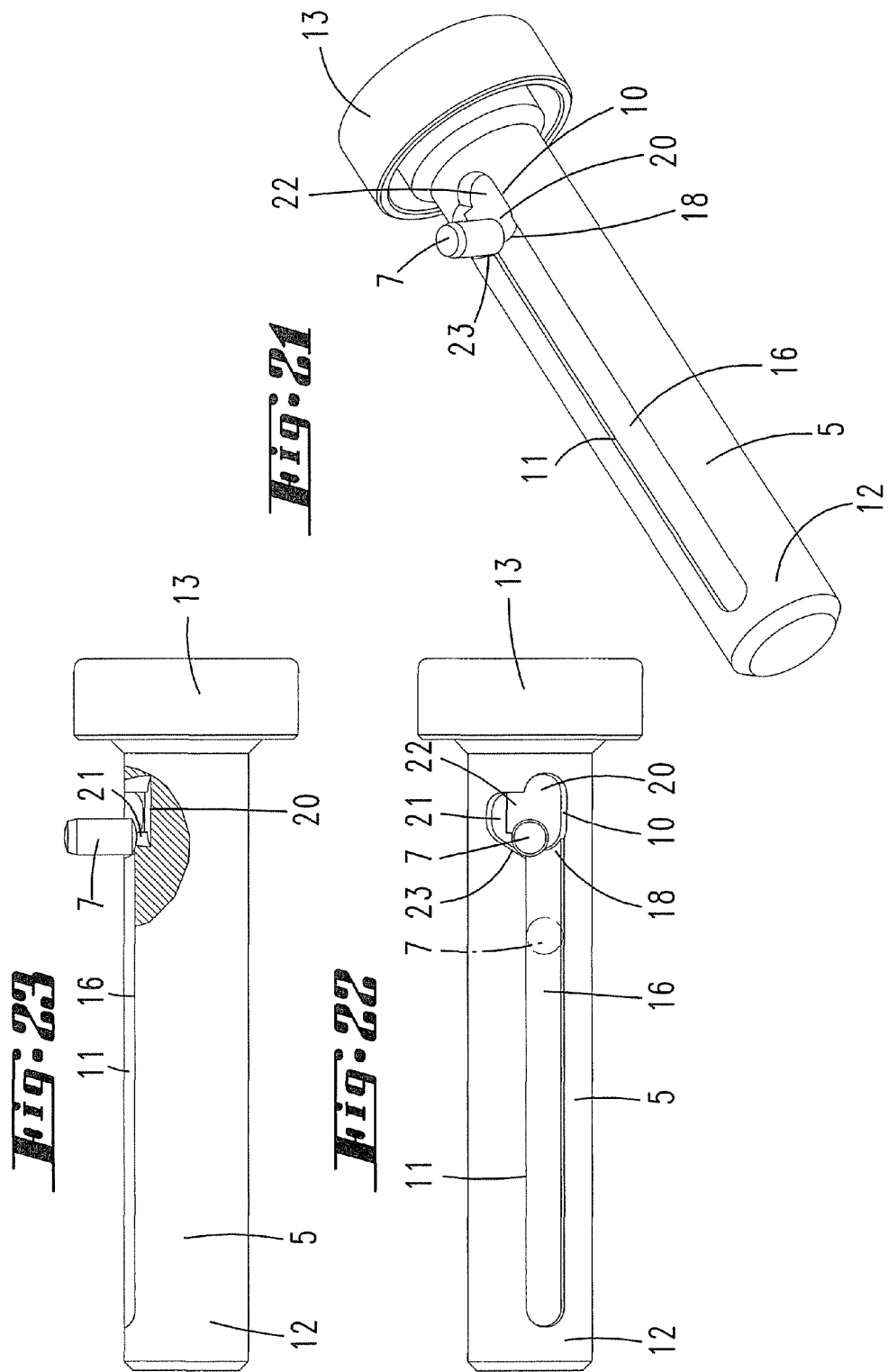

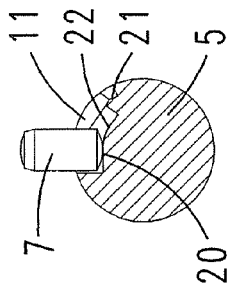
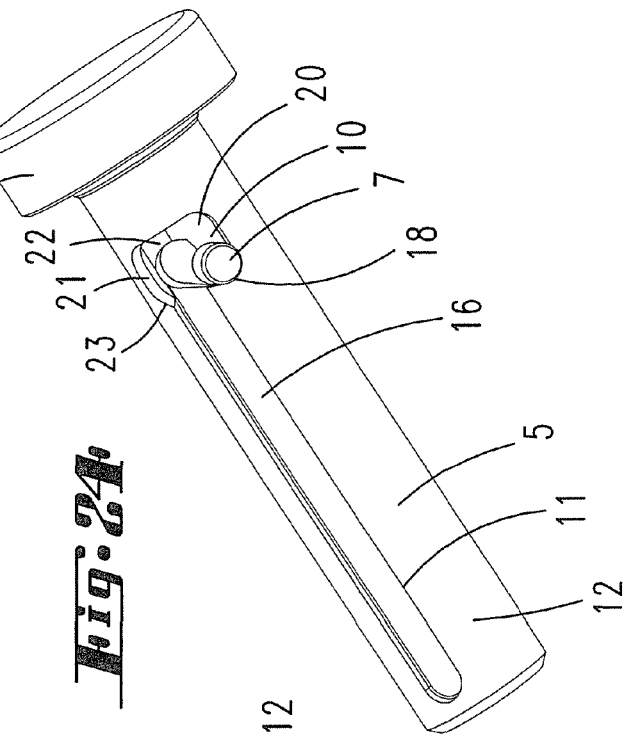
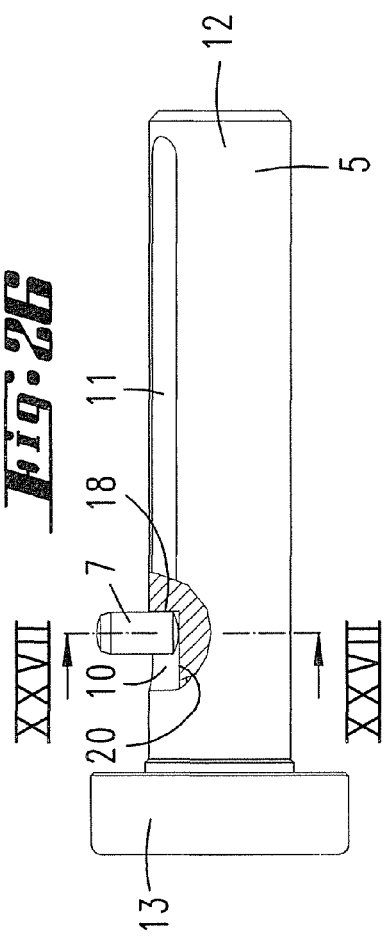
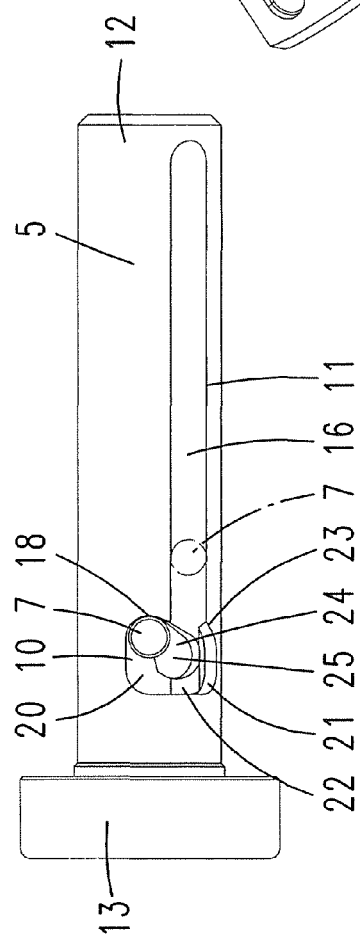

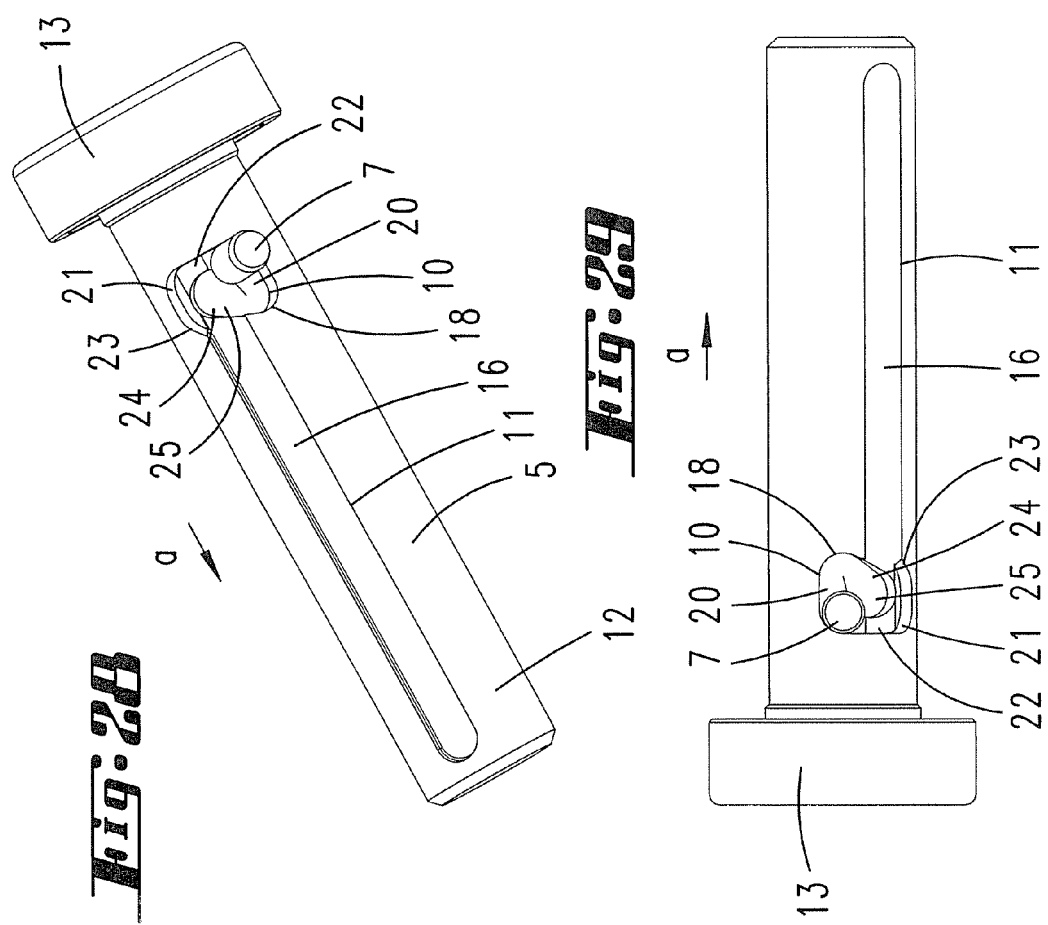

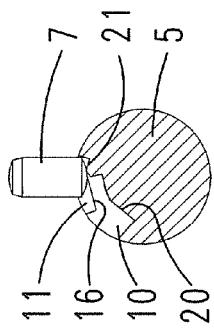
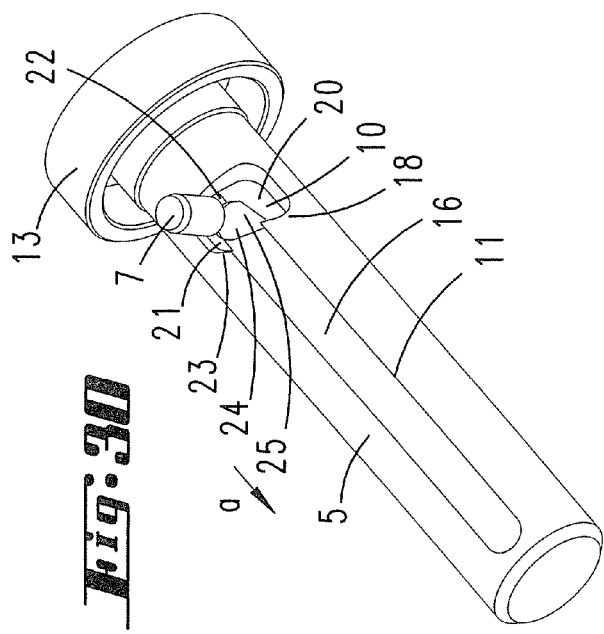
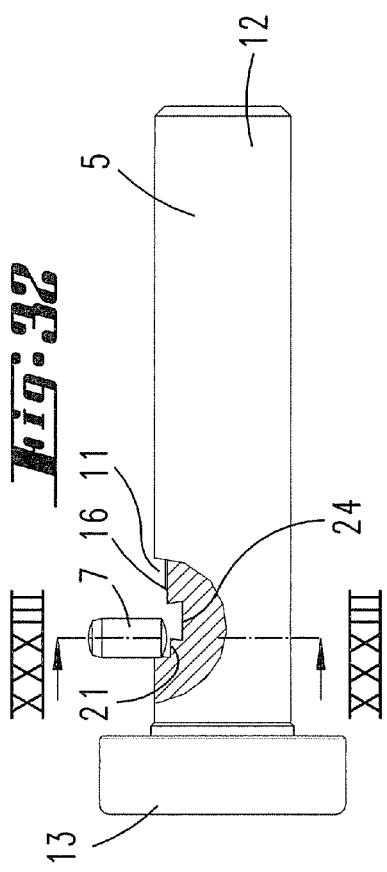
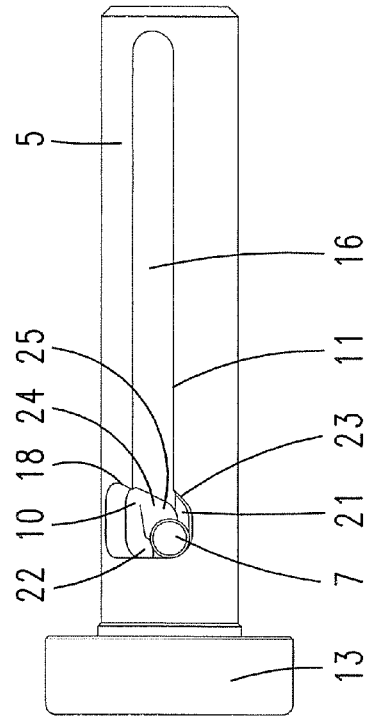

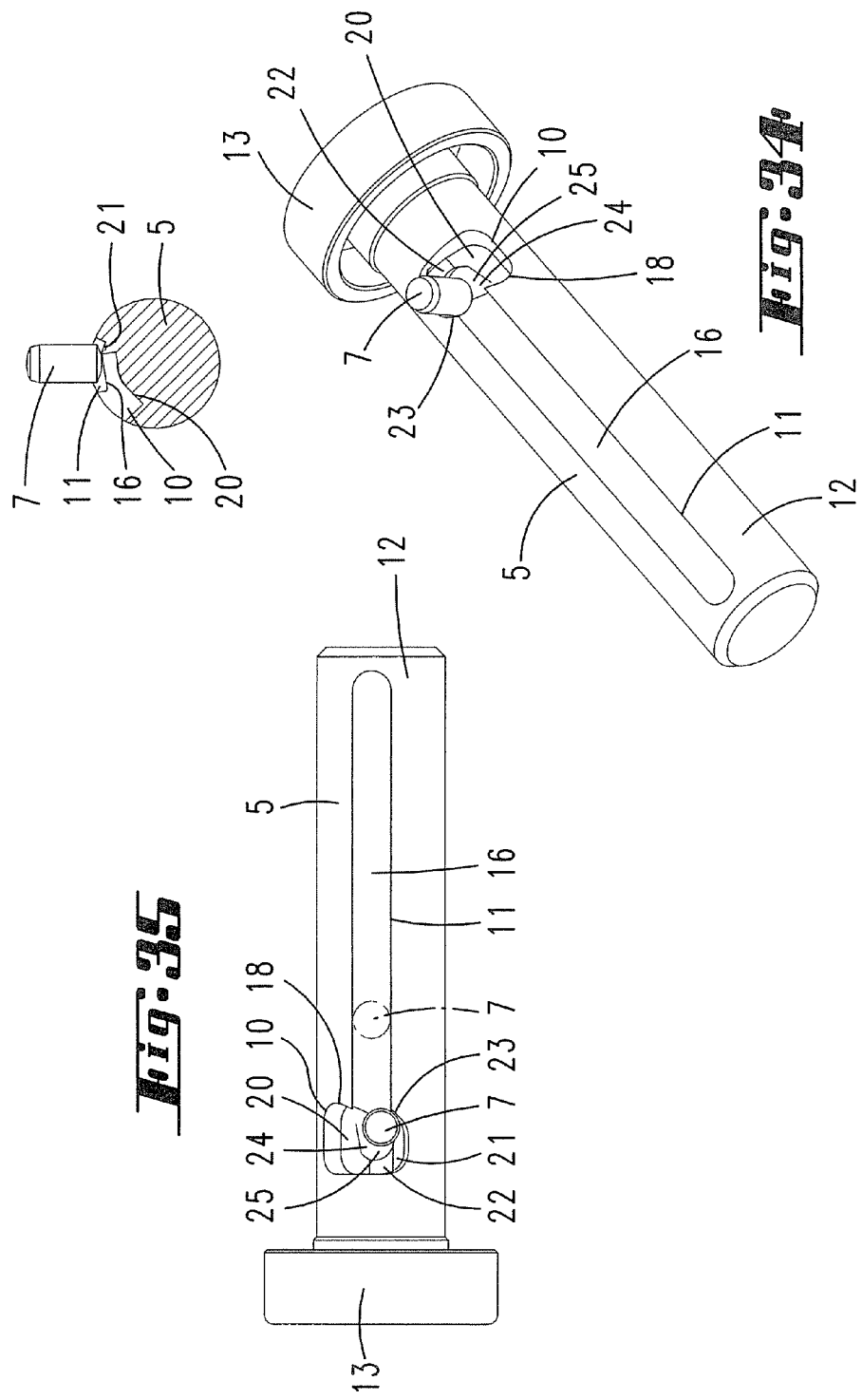

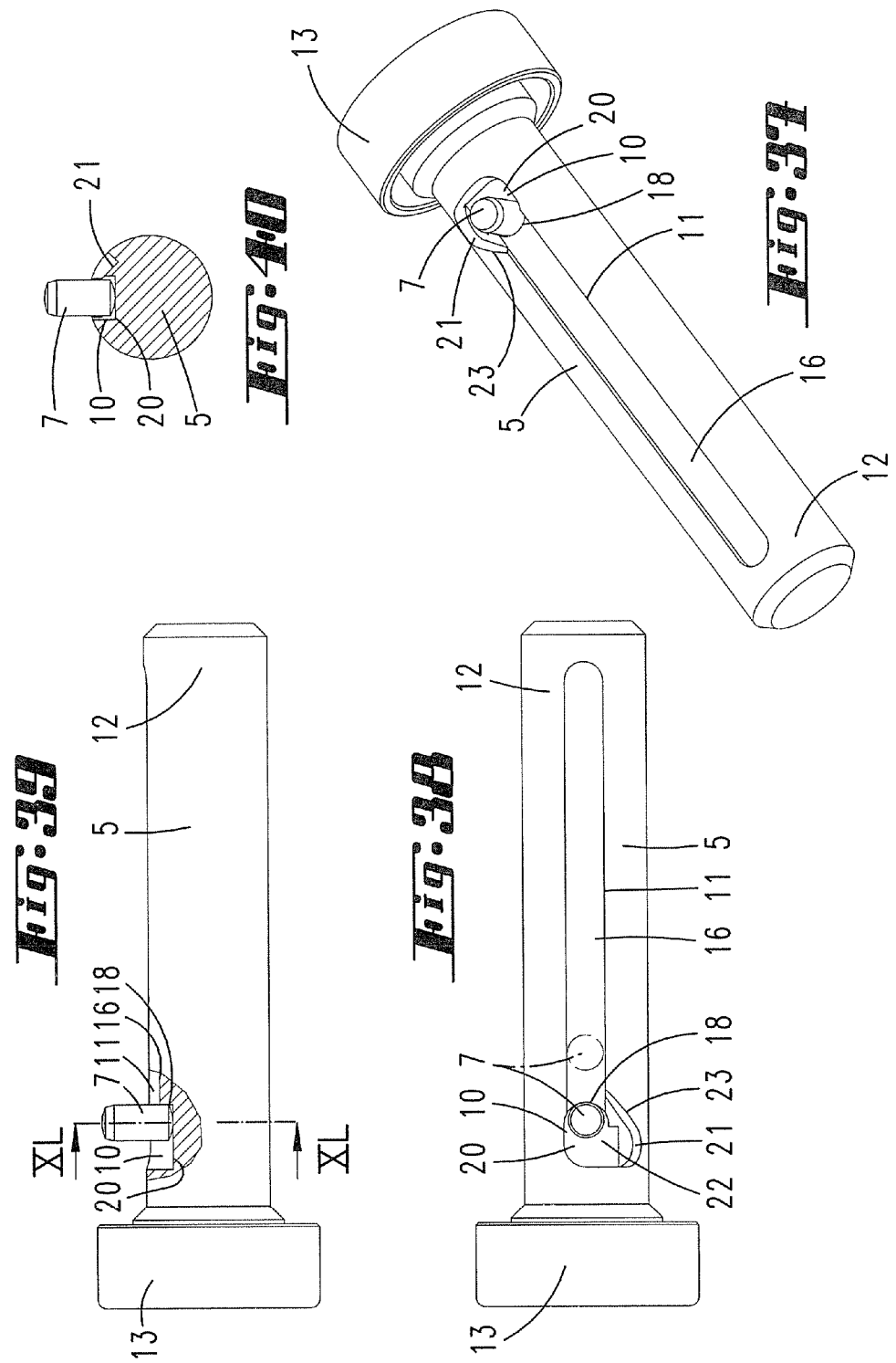

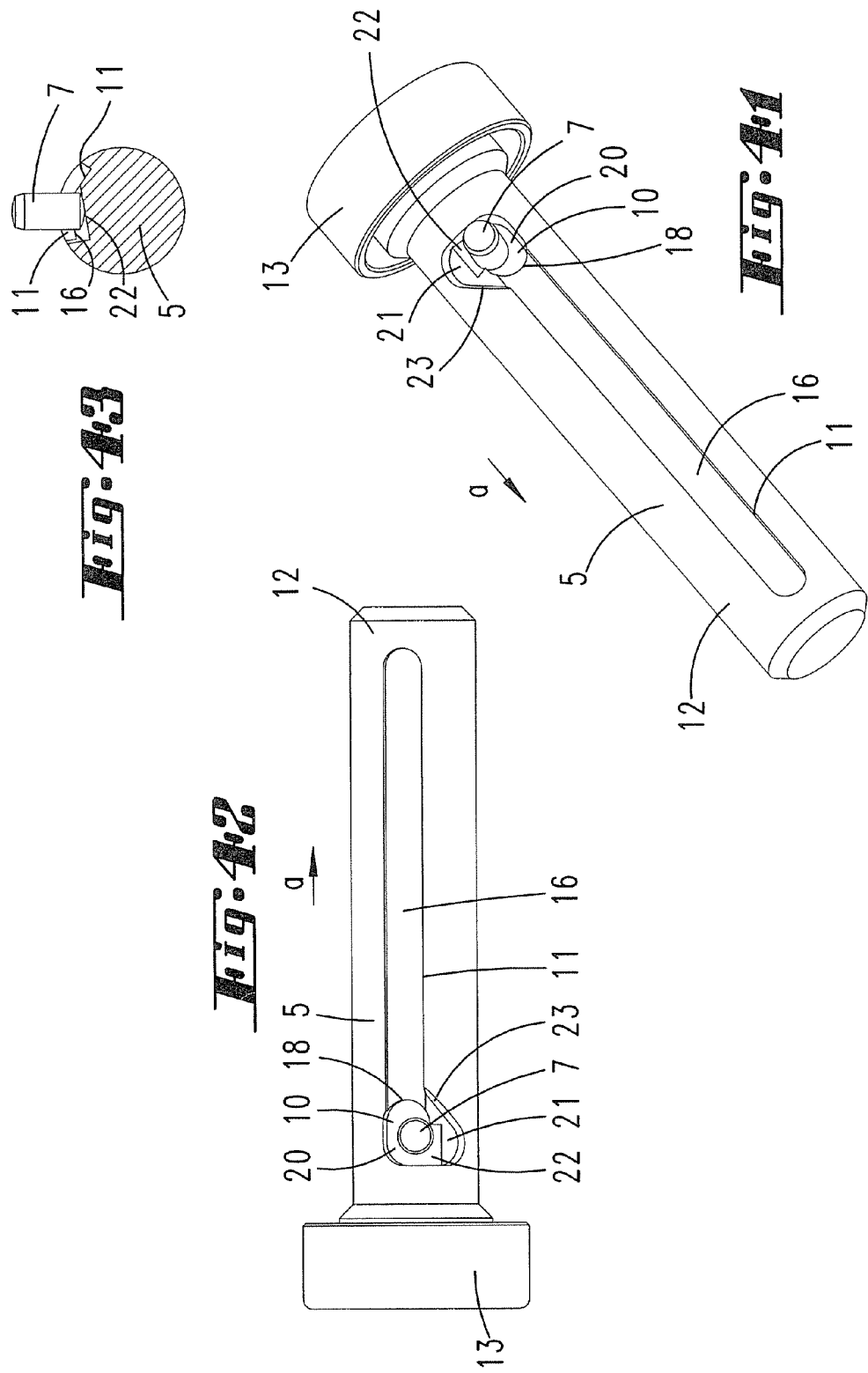

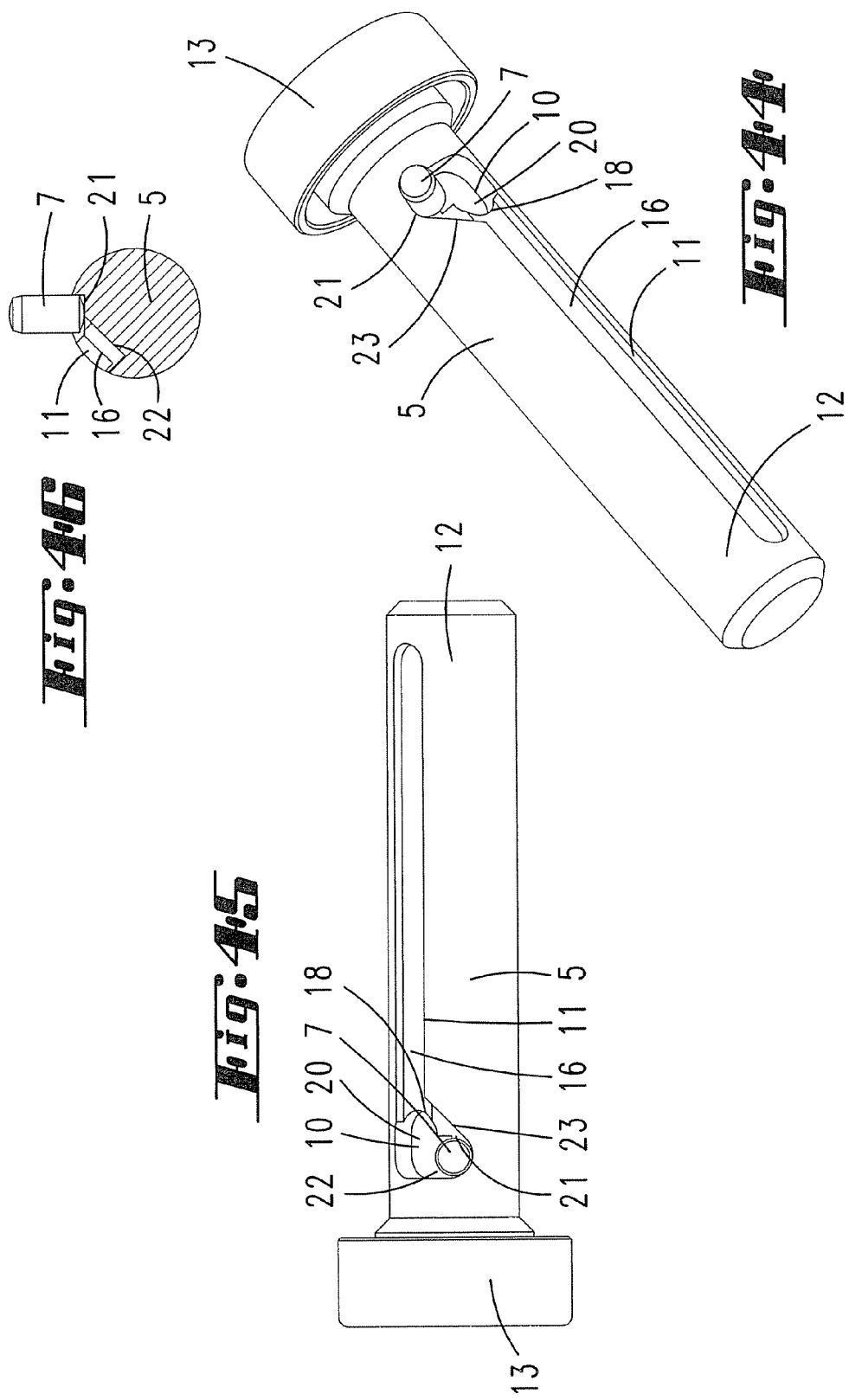

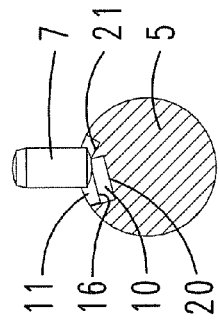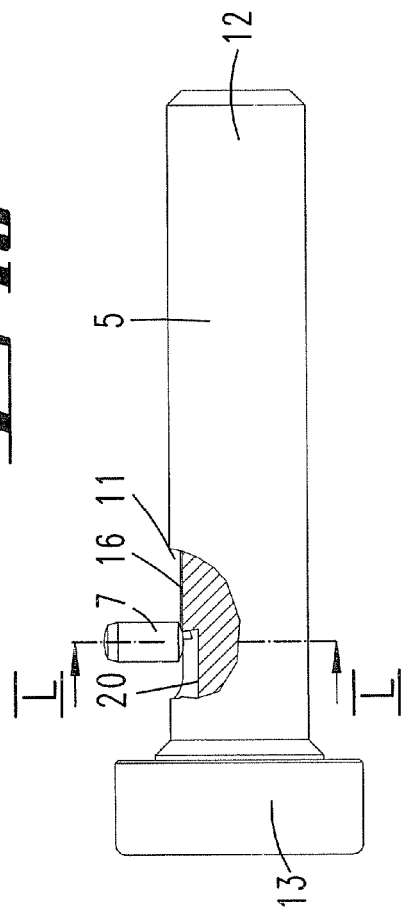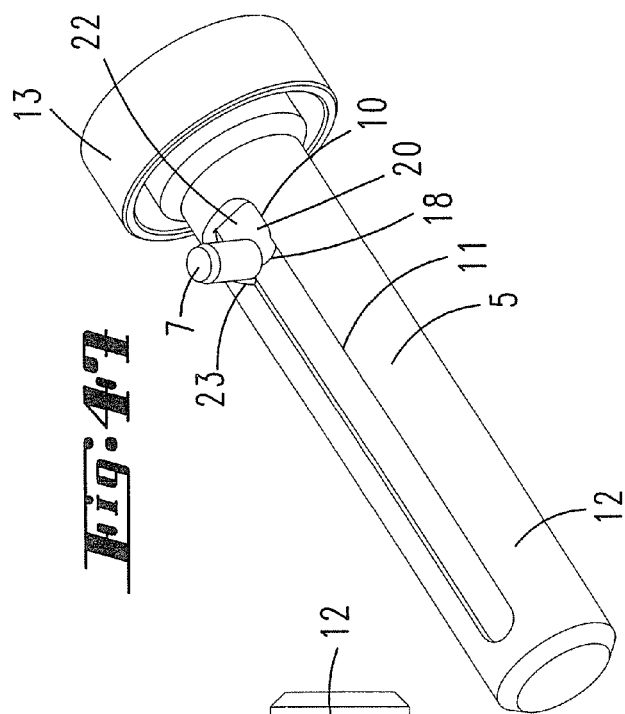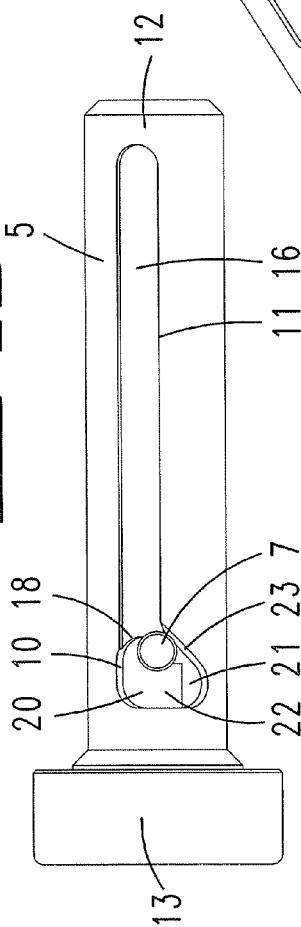

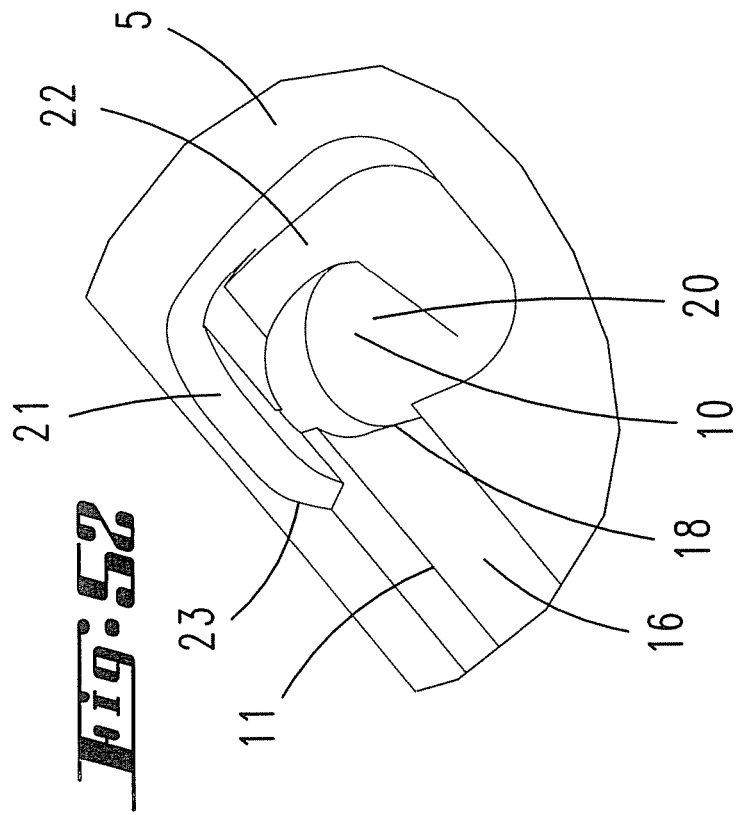
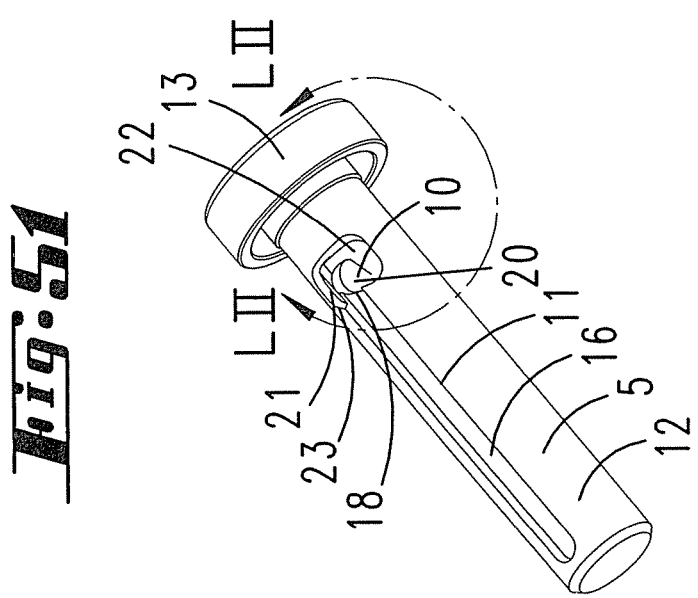

LOCKING BOLT FOR MOUNTING A TOOL ON A HYDRAULIC PRESS

CROSS-REFERENCE AND INCORPORATION BY REFERENCE

This patent application is a divisional of U.S. patent application Ser. No. 11/461,573, filed Aug. 1, 2006, and entitled "LOCKING BOLT FOR MOUNTING A TOOL ON A HYDRAULIC PRESS", abandoned, which, in turn, is a continuation-in-part of U.S. patent application Ser. No. 10/876,830, filed Jun. 25, 2004, and entitled "LOCKING BOLT FOR MOUNTING A TOOL ON A HYDRAULIC PRESS", abandoned, which claims priority from German Patent Application serial No. 10329007.9, filed Jun. 27, 2003. Each of these applications are hereby incorporated by reference herein in their entireties.

FIELD OF THE INVENTION

The invention relates in the first instance to a locking bolt for mounting a tool in a hydraulic press, it being possible for the locking bolt to move in a bolt receptacle between a locking position and a release position, with a securing element, which is located in the bolt receptacle and secures the locking position by positive engagement in the locking bolt, the locking bolt also having a securing portion, and the locking bolt being secured against movement into the release position when the securing element is located in the securing position.

BACKGROUND OF THE INVENTION

Locking bolts of the type in question are known and serve for example for fixing pressing, cutting or similar tools in a hydraulic press, it being possible for the latter to be formed in such a way that it can be actuated electrically or else by means of a hand lever. For quickly changing the tool to be put in position, a locking bolt of this type is formed as a push-in bolt.

Reference is made to DE 101 10 882 A1. This discloses a locking bolt of this type which has a securing portion similar to an annular groove, formed coaxially in relation to the longitudinal axis of the bolt. In the operating position, a spring-supported securing element disposed in the receiving neck of the press enters into this securing portion. By pulling in the axial direction of the locking bolt, the securing element is displaced back against the spring force over a run-up slope of the groove-like securing portion, whereby the locking bolt can be brought out of the operating position into a release position for changing the tool. This tool release position of the locking bolt is likewise secured by a further annular groove, which is disposed at the end, i.e., in the region of the end of the locking bolt that is opposite from the handle, and into which the securing element can enter. As a result of this known configuration, the locking bolt is captivity secured on the press, in particular in the region of its receiving neck, both in the tool securing position and in the tool release position.

With regard to the prior art described above, it can be regarded as a technical problem for the invention to improve further a locking bolt of this type in question, while providing simple handling with regard to the securing of the locking position.

SUMMARY OF THE INVENTION

The locking bolt has a longitudinal groove, that the securing portion is formed with a securing depth in any event corresponding to a groove depth of the longitudinal groove and that the securing portion is formed such that it is adjacent to the longitudinal groove in the circumferential direction, with a direct transition from a groove base into the securing portion. As a result of this configuration according to the invention, a locking bolt which is distinguished by increased locking security is provided. For instance, the locking position can be achieved by sliding displacement of the locking bolt along its longitudinal axis and final rotation of the locking bolt. Accordingly, for unlocking the locking bolt, it is absolutely necessary for the locking bolt first to be rotated in the circumferential direction, in order to re-establish the relationship of the securing element with the longitudinal groove of the locking bolt.

In the course of the longitudinal displacement of the locking bolt into the locking position or into the release position, the locking bolt is guided in the longitudinal groove by engagement of the securing element and thereby secured against rotation. In an advantageous manner, the end region of the longitudinal groove associated with the securing portion may be provided with a deflecting portion for the securing element, which urges the securing element that is guided by the longitudinal groove into the securing portion that is adjacent to the longitudinal groove with respect to the circumferential direction when the locking bolt is pressed into the locking position. As a result of this, the securing position is automatically achieved by pressing in the locking bolt. However, in the simplest way, the longitudinal groove may be formed in an L-shaped manner in outline in the region of the securing position.

To accomplish the securing position, a deliberate rotation of the locking bolt in the circumferential direction is required, whereby the securing portion is brought into a relationship with the securing element. In the case of this configuration according to the invention, the groove base of the longitudinal groove goes over steplessly into the base of the securing portion, it also being possible for the securing element to be formed as a rigid element, i.e., in particular not movable along its longitudinal axis, for example in the form of a grub screw or the like. This securing element is, moreover preferably disposed in the region of a fork leg of a fork-shaped receiving neck of the press and thereby protrudes into a bore guiding the locking bolt. It is further preferred for the longitudinal groove of the locking bolt to be closed at the end, i.e. in the region of the end that is opposite from the securing portion, consequently for it to end at a distance from the free end region of the locking bolt.

As a result of this configuration, the locking bolt is captivity held on the press by constant engagement of the securing element in the longitudinal groove or in the securing portion. It is further preferred for the longitudinal groove to be formed on the underside of the locking bolt. Only compressive stresses occur here during operation. The securing element is accordingly likewise placed underneath the locking bolt.

The invention also relates to an improvement of the locking position that the locking bolt has a longitudinal groove and that the securing portion is formed such that it is offset in a step-like manner in relation to a groove base. As a result of this configuration, a locking bolt which is distinguished by increased security of the locking position along with simple handling is provided. The locking bolt is thereby always guided by engagement of the securing element in the longitudinal groove of the locking bolt, and rotationally secured at least in the path of displacement. The securing position is achieved when the securing element guided by the longitudinal groove reaches the securing portion of the locking bolt, the securing element being made to drop into the securing portion by the greater depth of the base of the securing portion than the base of the groove, it being preferred for an audible clicking to be perceptible.

After reaching the securing portion, the securing element can only be displaced into the longitudinal groove again by deliberate raising of the same to the level of the base of the groove, after which the locking bolt is again released for being displaced. The securing portion that is formed offset in a step-like manner in relation to the base of the groove may in this case be formed as a direct transition to the longitudinal groove. Alternatively, the securing portion that is offset in a step-like manner may also be formed such that it is adjacent to the longitudinal groove in the circumferential direction.

The securing element can be displaced against spring force. This configuration proves to be advantageous in particular in the case where the securing portion is disposed such that it is offset in a step-like manner with respect to the groove base. A construction in which the securing portion is formed with a run-up slope, for the movement of the securing element into a securing element release position from which the displacement of the locking bolt into a tool-removing/changing position can take place, proves to be advantageous, in particular in terms of handling technology.

The run-up slope is in this case formed in the circumferential direction and/or axial direction of the locking bolt, a rotation of the locking bolt in the circumferential direction being additionally required for directing the securing element onto the run-up slope, in order thereby to displace the securing element out of the deeper base of the securing portion onto the higher groove base of the longitudinal groove, offset in a step-like manner. It is also possible in this case for the securing portion to be disposed as an extension of the longitudinal groove and for the run-up slope to be formed in a region of the securing portion that is adjacent thereto.

It is consequently further proposed for the run-up slope to go over in the circumferential direction into a returning portion, which is disposed with further preference oppositely in the circumferential direction with respect to the longitudinal groove than the securing portion. It may also be provided that the returning portion is formed such that it partly overlaps in the longitudinal direction of the groove with the associated end region of the longitudinal groove.

For handling to be simplified further, it is proposed that the locking bolt is spring-biased into its opening position. Accordingly, in the securing position of the locking bolt, the securing element is supported in the blocking portion of the securing portion as a result of the spring-loaded way in which the locking bolt is acted upon in the direction of the opening position, which blocking portion may be the step between the longitudinal groove and the securing portion or else a wall region of the securing portion that is adjacent to the longitudinal groove. This spring loading has the effect that the locking position is further secured against unwanted unlocking.

With the longitudinal groove and the securing portion disposed adjacent to each other, enforced rotation of the locking bolt can also be achieved for pivoting the securing portion into the region of the securing element by provision of a torsion spring or the like which acts on the securing bolt, so that the locking bolt is rotationally biased, with a rotating force in the direction of the securing portion. For movement of the locking bolt out of the locking position into the release position, it is preferred for a movement in the direction of the locking position to be required, in order hereafter to guide the securing element via the returning portion back into the longitudinal groove by means of a rotating movement of the locking bolt in the circumferential direction. A further increase in the security of the locking position is obtained by the securing element being circumferentially separated in the locking position from the longitudinal groove by a locking nose. This measure has the effect that, in the locking position, the locking bolt is rotationally secured, at least in one direction, by the chosen rear engagement, which rotational securement can only be discontinued by a movement of the locking bolt in the direction of the locking position and subsequent rotation in the circumferential direction.

It is preferred for the securing portion to have a detent depression, which is formed in the longitudinal direction of the longitudinal groove and goes over in the circumferential direction into the securing portion, which is disposed ahead of the detent depression in the locking direction of the locking bolt. It may also be provided that the run-up slope, optionally together with the returning portion, surrounds the detent depression, for example to form a spiral ramp for returning the securing element into the longitudinal groove. Finally, it is proposed that the returning portion is in any event further elevated in a step-like manner in the transitional region to the groove. In this way it is ensured that, in the course of the locking, the securing element finds the securing portion and snaps in there. Unintentional lateral deflection of the securing element onto the returning portion by inadvertent turning when the locking bolt is being pushed in is avoided as a result.

DESCRIPTION OF THE DRAWINGS

The invention is explained in more detail below with reference to the accompanying drawings, which merely represent a number of exemplary embodiments and in which:

FIG. 1 shows a partially sectioned side view of a press receiving neck with a locking bolt in the secured locking position;

FIG. 1a shows a part of FIG. 1, enlarged;

FIG. 2 shows the plan view of the representation in FIG. 1, a partial section being taken through the securing region of the locking bolt;

FIG. 2a shows part of FIG. 2, enlarged;

FIG. 2' shows a representation according to FIG. 1, with further parts of the device in dotted lines, the locking bolt being in its released position;

FIG. 2'a shows a part of FIG. 2', enlarged;

FIG. 2" shows the device according to FIG. 2', in a front view;

FIG. 2"a shows part of FIG. 2", enlarged;

FIG. 3 shows the locking bolt in a first embodiment in perspective representation, for an intermediate position in the course of the locking of the same;

FIG. 4 shows a side view representation of the locking bolt, seen in the direction of a longitudinal groove and a securing portion and also a securing element guided in the longitudinal groove, for the intimidate position according to FIG. 3;

FIG. 5 shows a representation turned through 90[deg.] about the longitudinal axis of the locking bolt in comparison with the representation in FIG. 4, partly in the region of the engagement of the securing element in the securing portion, in a sectioned representation;

FIG. 6 shows the section along the line VI-VI in FIG. 5,

FIG. 7 shows a further perspective representation of the locking bolt as basically shown in FIG. 3, now showing the secured detent position;

FIG. 8 shows a representation corresponding to FIG. 4, but for the position of the locking bolt according to FIG. 7;

FIG. 9 shows a sectional representation corresponding to FIG. 6, but for the position according to FIGS. 7 and 8;

FIG. 10 shows the locking bolt according to FIG. 3 or FIG. 7, being in an intermediate position in the course of the locking process;

FIG. 11 shows a side view of the representation of FIG. 10;

FIG. 12 shows a sectional representation corresponding to FIG. 9, but for the intermediate position according to FIGS. 10 and 11;

FIG. 13 shows a further sectional representation according to FIG. 9, but for the unlocking position;

FIG. 14 shows a perspective representation of the locking bolt in a second embodiment, for the locking position;

FIG. 15 shows the side view representation of FIG. 14;

FIG. 16 shows a partially sectioned representation of FIG. 15, turned through 90[deg.] about the longitudinal axis of the locking bolt;

FIG. 17 shows the locking bolt in perspective representation of FIG. 15 or FIG. 16 respectively, for an intermediate position in the course of the unlocking;

FIG. 18 shows a representation corresponding to FIG. 15, but for the intermediate position according to FIG. 17;

FIG. 19 shows a follow-up representation of FIG. 17;

FIG. 20 shows the side view representation for FIG. 19;

FIG. 21 shows a follow-up representation of FIG. 19;

FIG. 22 shows the corresponding side view representation of FIG. 21;

FIG. 23 shows a representation corresponding to FIG. 16, but for the intermediate position according to FIGS. 21 and 22;

FIG. 24 shows a perspective representation of a locking bolt in a third embodiment, for the locking position;

FIG. 25 shows the side view representation for FIG. 24;

FIG. 26 shows a partially sectioned side view representation according to FIG. 23, but for the embodiment according to FIGS. 24 and 25;

FIG. 27 shows the section along the line XXVII-XXVII in FIG. 26;

FIG. 28 shows a perspective representation of the locking bolt according to FIG. 24, but in an intermediate position in the course of the unlocking process;

FIG. 29 shows the side view representation of FIG. 28;

FIG. 30 shows a follow-up representation of FIG. 28;

FIG. 31 shows the side view representation for FIG. 30;

FIG. 32 shows a representation corresponding to FIG. 26, but for the intermediate position according to FIG. 30;

FIG. 33 shows the section along the line XXXIII-XXXIII in FIG. 32;

FIG. 34 shows a follow-up representation of FIG. 30;

FIG. 35 shows the side view representation of FIG. 34;

FIG. 36 shows a cross-sectional representation according to FIG. 33, but for the position according to FIGS. 34 and 35;

FIG. 37 shows a perspective representation of a locking bolt in the locking position, for a further embodiment;

FIG. 38 shows the side view representation for FIG. 37, seen in the direction of the longitudinal groove;

FIG. 39 shows a partially sectioned side view representation according to FIG. 32, but for the embodiment according to FIG. 35;

FIG. 40 shows the section along the line XL-XL in FIG. 39;

FIG. 41 shows a perspective representation according to FIG. 37, but for an intermediate position in the course of the unlocking process;

FIG. 42 shows the side view representation of FIG. 41;

FIG. 43 shows a cross-sectional representation according to FIG. 40, but for the intermediate position according to FIGS. 41 and 42;

FIG. 44 shows a follow-up representation of FIG. 41;

FIG. 45 shows the side view representation of FIG. 44;

FIG. 46 shows a cross-sectional representation corresponding to FIG. 43, but for the intermediate position according to FIGS. 44 and 45;

FIG. 47 shows a follow-up representation of FIG. 44;

FIG. 48 shows the side view representation of FIG. 47;

FIG. 49 shows a representation corresponding to FIG. 39, but for the intermediate position according to FIGS. 47 and 48;

FIG. 50 shows the cross-section along the line L-L, in FIG. 49;

FIG. 51 shows a locking bolt in a further embodiment, in perspective representation;

FIG. 52 shows an enlargement of the region LII in FIG. 51.

DETAILED DESCRIPTION OF THE INVENTION

FIGS. 1 and 2 show a receiving neck 1 of a hydraulic press, which press is shown further in a sight elevation in FIG. 2".

FIG. 2' is a perspective view from the upper side of the embodiment of FIG. 2" and FIG. 2'a an enlarged view of FIG. 2'. The hydraulic press can be actuated electrically. The receiving neck 1 is configured in the customary fork-shaped manner, with a bolt receptacle 4 in the form of a through-bore, passing through the fork legs 2, 3 transversely in relation to the extent of the neck. A locking bolt 5 is secured in this bolt receptacle 4.

The receiving neck 1 serves for fixing a tool to be mounted on the press, for example for pressing. The tool is not represented in the drawings.

The tool can be exchangeably fixed on the press or on its receiving neck 1, so that other tools, such as cutting tools for example, can also be put in position.

As the partial sectional representation in FIG. 1 reveals in particular, in the locking position, the locking bolt 5 passes through the bolt receptacle 4 of the fork leg 2 on the actuation side and bores 6 formed in the tool and, at the end, enters the bolt receptacle 4 of the other fork leg 3 for locking the tool.

The locking bolt 5 can be displaced along its locking bolt axis y, running transversely in relation to the receiving neck axis x, from a locking position according to FIGS. 1 and 2 into a release position, and vice versa, both the release position and the locking position being secured by means of a securing element 7.

The securing element 7, as one can see in more detail from FIGS. 1, 1a and 2"a, is displaceably accommodated in a bore 8 in the region of the one fork leg 2, aligned transversely in relation to the locking bolt axis y and crossing through the bolt receptacle 4. The disposition is further chosen here in such a way that the securing element 7 lies in the portion of the bore 8 that is remote from the free end of the receiving neck 1 such that it is rearwardly supported by means of a compression spring 9, and consequently acts by means of the compression spring 9 in the direction of the locking bolt 5.

For locking the locking bolt, the pin-like securing element 7 is located in a securing portion 10, which can be seen in more detail also from FIG. 2a, which is formed in the circumferential surface of the locking bolt 5 and, for displacing the locking bolt 5 into a tool release position, goes over into a longitudinal groove 11 which is open on the side representing the wall of the circumferential surface. In the course of the opening displacement of the locking bolt 5, the fixed securing element 7 is guided by the longitudinal groove 11, which at the end ends at a distance from the free end 12 of the locking bolt 5, and consequently forms in cooperation with the securing element 7 a stop in the unlocking position. As a result of this, the locking bolt 5 is captivity secured on the receiving neck 1.

The locking bolt 5 is spring-biased in the opening direction, i.e. in the direction of the tool release position, for which purpose the locking bolt 5 is acted upon in the region of an externally accessible handling head 13, from the underside, by a compression spring 15, which is located in an associated depression 14 which is coaxial in relation to the locking bolt 5.

FIGS. 3 to 13 show a first embodiment of the locking bolt 5. For better illustration, in the drawings of this embodiment and also in those of the further exemplary embodiments, only the interacting locking bolts 5 and securing elements 7 are shown. The respective local disposition of these two elements can be gathered from FIGS. 1 and 2.

In the first embodiment, the securing portion 10 is formed such that it is located adjacent to the longitudinal groove 11 in the circumferential direction of the locking bolt 5, with a direct transition from a groove base 16 into the securing portion 10. The securing depth of the securing portion 10 corresponds to the groove depth of the longitudinal groove 11.

Accordingly, in the end region opposite from the bolt end 12, the longitudinal groove 11 goes over directly into the securing portion 10. The end face 17 of the longitudinal groove 11 that is facing the handling head 13 extends at an obtuse angle in relation to the longitudinal marginal edges of the longitudinal groove 11 to form a control surface. When there is longitudinal displacement of the locking bolt 5 in the direction of the locking position (arrow a indicates the pushing-in locking direction), this control end face 17 of the longitudinal groove 11 comes up against the fixed, pin-like securing element 7, which, when there is further pushing-in movement of the locking bolt 5, causes a rotation of the same, so that the securing portion 10 is turned into the effective region of the securing element 7. In this position, the end 12 of the locking bolt 5 already lies in the bolt receptacle 4 of the opposite fork leg 3.

After letting go the locking bolt 5, it is displaced back again, counter to the pushing-in locking direction a, on account of the compression spring 15 acting upon it from the underside, until a blocking surface 18 of the securing portion 10 that is adjacent to the longitudinal groove 11 comes up against the securing element 7. The locking bolt 5 is then secured in the locking position. This securing position is further supported by the fact that the securing element 7 is circumferentially separated from the longitudinal groove 11 by a locking nose 19, which points in the direction in which the compression spring acts, i.e. in the direction of the handling head 13, and consequently provides the rear engagement with respect to the longitudinal groove 11. As a result of the formation of the locking nose 19, the secured locking cannot be discontinued by simple, in particular unintentional, turning back of the locking bolt 5, which would have the result that the longitudinal groove 11 is found again by the securing element.

Rather, as FIGS. 10 to 13 show, a deliberate turning of the locking bolt 5 in the circumferential direction, deliberate since it overcomes the force of the compression spring 15, is necessary to bring the locking nose 19 past the securing element 7 and, finally, to bring the longitudinal groove 11 back into a relationship with the securing element 7. After this, to release the tool, the locking bolt 5 can be drawn back until it is in a stop position predefined by the end of the groove.

In the case of this first embodiment, the securing element 7 may be formed as a fixed pin, i.e. without rear spring biasing.

FIGS. 14 to 23 show a second embodiment of the locking bolt 5 according to the invention. A major difference in comparison with the exemplary embodiment previously described is that here the securing portion 10 is formed such that it is offset in a step-like manner in relation to the groove base 16, so that in the course of the locking process, i.e. when there is displacement of the locking bolt 5 in the pushing-in locking direction a, the securing element 7 guided by the longitudinal groove 11 is made to drop at the end into the securing portion 10—by being acted upon from the rear by means of the compression spring 9—and thereby comes to lie in a locking manner in front of a blocking surface 18 formed in the region of the step.

In the exemplary embodiment represented, the base 20 of the securing portion corresponds approximately to twice the depth of the groove base.

Furthermore, in the second exemplary embodiment represented, the securing portion 10 is disposed as an extension of the longitudinal groove 11. A further portion, formed adjacent to the securing portion 10, serves for returning the securing element 7 to the level of the groove base 16. This returning portion 21 is formed such that it partly overlaps in the longitudinal direction of the groove with the associated end region of the longitudinal groove, which goes over into the securing portion 10.

Extending from the base 20 of the securing portion, there extends in the circumferential direction a run-up slope 22, which opens out into the returning portion 21.

For secured locking of the locking bolt 5, the latter is moved in the customary way in the pushing-in locking direction a, until the securing element 7 drops behind the blocking surface 18 into the securing portion 10. After letting go the locking bolt 5, the latter is supported with its blocking surface 18 against the securing element 7, an outline configuration of the blocking surface 18 in the form of a segment of a circle having the effect of forming a locking nose 19, which prevents unintentional turning of the locking bolt 5.

Unlocking is only possible deliberately, by the locking bolt 5 being turned in the circumferential direction, the support of the locking nose 19 against the securing element 7 having the effect that a linear displacement of the locking bolt 5 counter to the opening direction, i.e. in the pushing-in locking direction a, is first carried out, after which the run-up slope 22 is brought into a relationship with the securing element 7. The deliberate turning of the locking bolt 5 has the effect that the securing element 7 is displaced against the force of the compression spring 9 acting upon the rear of the latter, over the mm-up slope 22 up to the level of the returning portion 21.

From this no longer detent-secured position, the compression spring 15 acting upon the locking bolt 5 first brings about a linear displacement in the opening direction until a returning slope 23 of the returning portion 21, supporting itself on the securing element 7, brings about a turning back of the locking bolt 5, after which finally the longitudinal groove 11 engages the securing element 7 again. After that, the locking bolt 5 is linearly displaced under the action of the compression spring into the release position.

As a result of this configuration, the locking element 7 is brought from the lower-level securing portion 10 via the run-up slope 22 and the returning portion 21 back to the higher-level longitudinal groove 11 by deliberate turning of the locking bolt 5 in the figurative sense.

FIGS. 24 to 36 show a third embodiment of the locking bolt 5. In this variant, too, a step is provided at the transition from the longitudinal groove 11 to the securing portion 10, so that the base 20 of the securing portion has a lower level than the groove base 16. By contrast with the exemplary embodiment previously described, this lower-level portion is formed merely as a detent depression 24, to which the actual securing portion 10 is adjacent. As a result of this configuration, the securing portion 10 is disposed such that it is adjacent to the longitudinal groove 11 in the circumferential direction or to an imaginary extension of the same.

The securing element 7 dropping into the detent depression 24 under spring bias in the course of the locking is deflected in the region of the detent depression 24 over a run-down slope 25 into the securing portion 10, which, by virtue of the fixed mounting of the securing element 7, has the consequence of an automatic turning of the locking bolt 5 after capture of the securing element 7 in the securing portion 10. As a result of this, the locking bolt 5 automatically finds the secured locking position. In this position, the locking bolt 5 is supported by means of the blocking surface 18 of the securing portion 10 on the securing element 7.

For unlocking, pressing in of the locking bolt 5 in the pushing-in locking direction a and subsequent turning of the locking bolt 5 in the circumferential direction of the same is necessary, in order in this way to bring the securing element 7 back on the higher-level groove base 16. The step-like detent depression 24 has the effect that an attempt merely to turn the locking bolt 5 out of the locking position does not lead to discontinuation of the secured locking position.

Pressing in of the locking bolt 5 in the pushing-in locking direction a has the effect that a run-up slope 22 is brought into the effective region of the securing element 7, by means of which run-up slope 22 the securing element 7 is brought onto the returning portion 21, by means of which the feeding to the longitudinal groove 11 takes place.

As the representations reveal, the run-up slope 22 and the returning portion 21 thereby surround the detent depression 24 spirally, the run-up slope 22 continuing to be associated with the region of the securing portion 10 that is facing the handling head 13 and the returning portion 21 continuing to be disposed oppositely in the circumferential direction with respect to the longitudinal groove 11 than the securing portion 10.

With respect to the side view representations in FIGS. 25, 29, 31 and 35, the securing element 7 completes a relative spiral path of movement around the detent depression 24 from the locking position according to FIG. 25. As a result of this configuration, the securing portion 10, run-up slope 22 and returning portion 21 act in the manner of a sliding link.

Shown in FIGS. 37 to 48 is a further embodiment, in which the securing portion 10 is disposed such that it is offset in a step-like manner as an extension of the longitudinal groove 11. Pressing in of the locking bolt 5 has the effect that the secured locking position is automatically assumed, by the blocking surface 18, forming the step between the longitudinal groove 11 and the securing portion 10, supporting itself against the securing element 7.

The discontinuation of this locking position takes place by pressing the locking bolt in the pushing-in locking direction a and subsequent turning of the locking bolt 5 in the circumferential direction, so that the higher-lying level of the groove base 16 can be reached by means of a run-up slope 22, extending in the circumferential direction, and a returning portion 21, adjoining said run-up slope and disposed such that it is adjacent to the securing portion 10, the securing element 7 resiliently entering the bore 8, as also in the case of the exemplary embodiments previously described. In the case of this embodiment, too, the returning portion 21 is formed such that it partly overlaps in the longitudinal direction of the groove with the associated end region of the longitudinal groove.

After pressing in the locking bolt 5 and turning the same, the secured locking is already discontinued, so that the compression spring 15, supporting the locking bolt 5, causes the displacement of the locking bolt 5 into the release position, this occurring, as a consequence of the returning slope 23 of the returning portion 21 that is pointing in the direction of the longitudinal groove 11, with simultaneous turning back of the locking bolt 5 into the neutral pivoted position, in which the securing element 7 is accommodated in the longitudinal groove 11.

Finally, FIGS. 51 and 52 show a further version, which corresponds in substantial parts to the embodiment previously described according to FIGS. 24 to 36. As the enlarged representation in FIG. 52 reveals in particular, in this embodiment, only the returning portion 21 is however further elevated in a step-like manner in the transitional region to the longitudinal groove 11, so that, after running over the returning portion 21, the securing element 7 reliably drops into the longitudinal groove 11 with spring assistance. In addition, unintentional lateral deflection of the securing element 7 onto the returning portion 21 by inadvertent turning when the locking bolt 5 is being pushed in to fix a tool is avoided as a result of this configuration. Rather, no turning of the locking bolt 5 about its longitudinal axis is possible before reaching the securing position, in which the securing element 7, leaving the longitudinal groove 11, engages in the securing portion 10.

All features disclosed are (in themselves) pertinent to the invention. The disclosure content of the associated/attached priority documents (copy of the prior patent application) is also hereby incorporated in full in the disclosure of the application, including for the purpose of incorporating features of these documents in claims of the present application.

The invention is claimed as follows:

1. An assembly comprising:
a press capable of being actuated hydraulically, electrically or by hand, said press being capable of having a pressing or cutting tool mounted therein, said press having a receiving neck including a pair of legs and a bolt receptacle passing through each said leg;
a locking bolt mounted in said bolt receptacles, said locking bolt having a head and a shank extending therefrom, a securing recess provided in said shank, said securing recess having a predetermined depth, a longitudinal groove provided in said shank, said longitudinal groove having a predetermined depth, said predetermined depth of said securing recess being at least equal to said predetermined depth of said longitudinal groove, a blocking surface separating said longitudinal groove from said securing recess, the securing recess being adjacent to and directly transitioning into the longitudinal groove in a circumferential direction,
a securing element captivity positioned between said locking bolt and one of said legs, said securing element being held captive on said press by constant engagement with one of said longitudinal groove and said securing recess, said locking bolt being moveable within said bolt receptacle between a locking position and a release position, said securing recess securing said locking bolt in the locking position by positive engagement with said securing portion;
a spring positioned between one of said legs and said head of said locking bolt to bias said locking bolt into the release position when said spring is an expanded state.

2. An assembly according to claim 1, wherein the securing recess is offset in a step-like manner in relation to a the longitudinal groove.

3. An assembly according to claim 1, wherein the securing element is spring-biased.

4. An assembly according to claim 1, wherein the securing recess is formed with a run-up slope for the movement of the securing element into a securing element release position.

5. An assembly according to claim 4, wherein the run-up slope is formed in a circumferential direction and/or an axial direction of the locking bolt.

6. An assembly according to claim 5, wherein the run-up slope goes over in the circumferential direction into a returning portion.

7. An assembly according to claim 6, wherein the returning portion is disposed oppositely in the circumferential direction with respect to the longitudinal groove than the securing recess.

8. An assembly according to claim 6, wherein the returning portion partly overlaps in a longitudinal direction of the longitudinal groove with an associated end region of the longitudinal groove.

9. An assembly according to claim 1, wherein the locking bolt is spring-biased in a rotating manner, with a rotating force in the direction of the securing recess.

10. An assembly according to claim 1, wherein for movement of the locking bolt out of the locking position into the release position, a movement in the direction of the locking position is required first.

11. An assembly according to claim 1, wherein in the locking position, the securing element is circumferentially separated from the longitudinal groove by a locking nose.

12. An assembly according to claim 1, wherein the securing recess has a detent depression formed in a longitudinal direction of the longitudinal groove and goes over in a circumferential direction into the securing recess, which is disposed forward of the detent depression in a locking direction of the locking bolt.

13. An assembly according to claim 12, wherein the securing recess is formed with a run-up slope for the movement of the securing element into a securing element release position, the run-up slope goes over in the circumferential direction into a returning portion, said run-up slope, optionally together with the returning portion, surrounds the detent depression.

14. An assembly according to claim 1, wherein the securing recess is formed with a run-up slope for the movement of the securing element into a securing element release position, the run-up slope goes over in the circumferential direction into a returning portion, the returning portion is elevated in a step-like manner in a transitional region to the longitudinal groove.

15. An assembly according to claim 1, wherein said locking bolt is non-rotatable relative to said press when said securing element is held captive within said longitudinal groove.

16. An assembly according to claim 1, wherein said locking bolt is formed of one-piece.

* * * * *